July 8, 1941.   F. W. COTTERMAN   2,248,492
VEHICLE TRANSMISSION GEARING
Original Filed Dec. 4, 1937   3 Sheets-Sheet 1
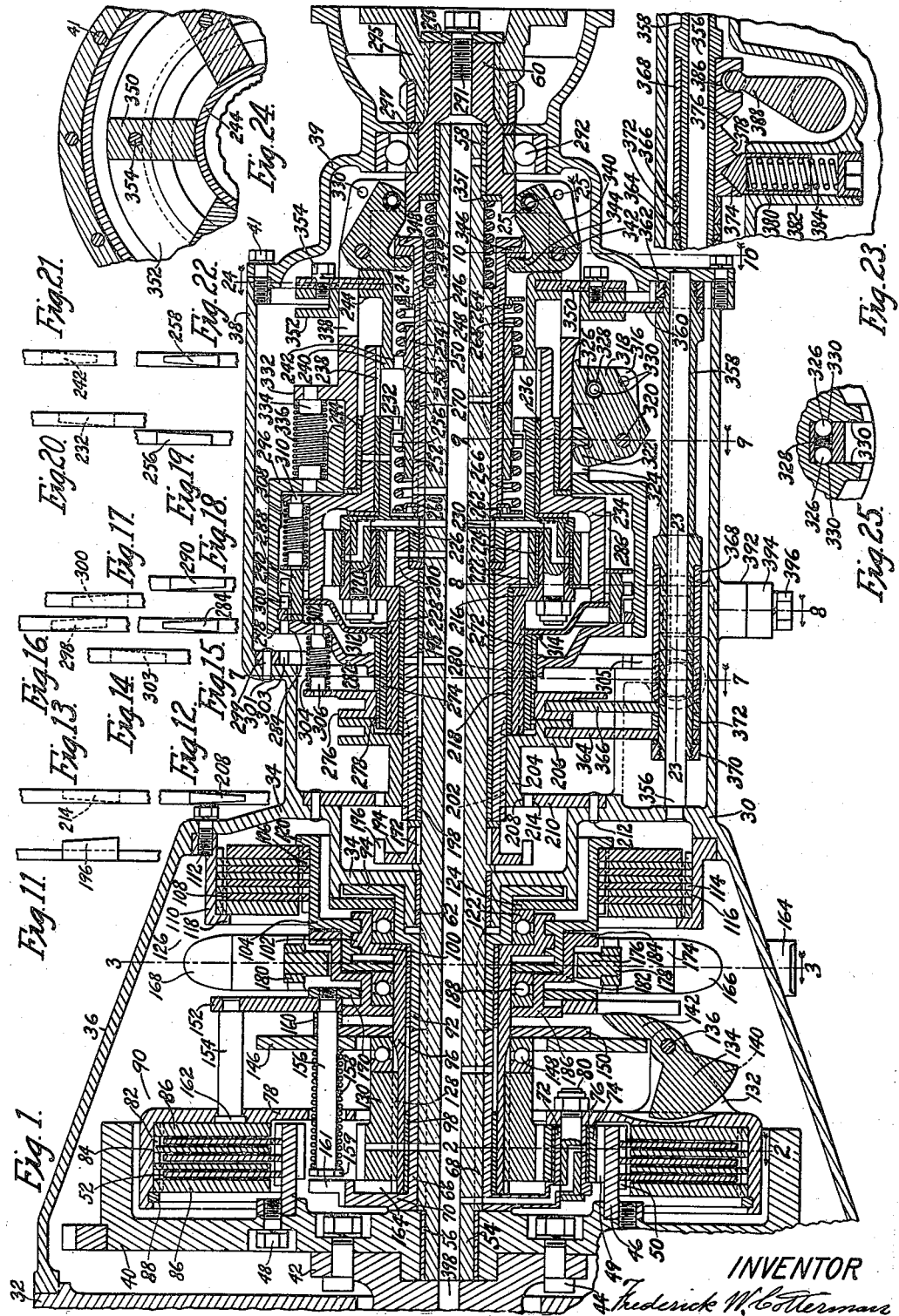
INVENTOR
Frederick W. Cotterman

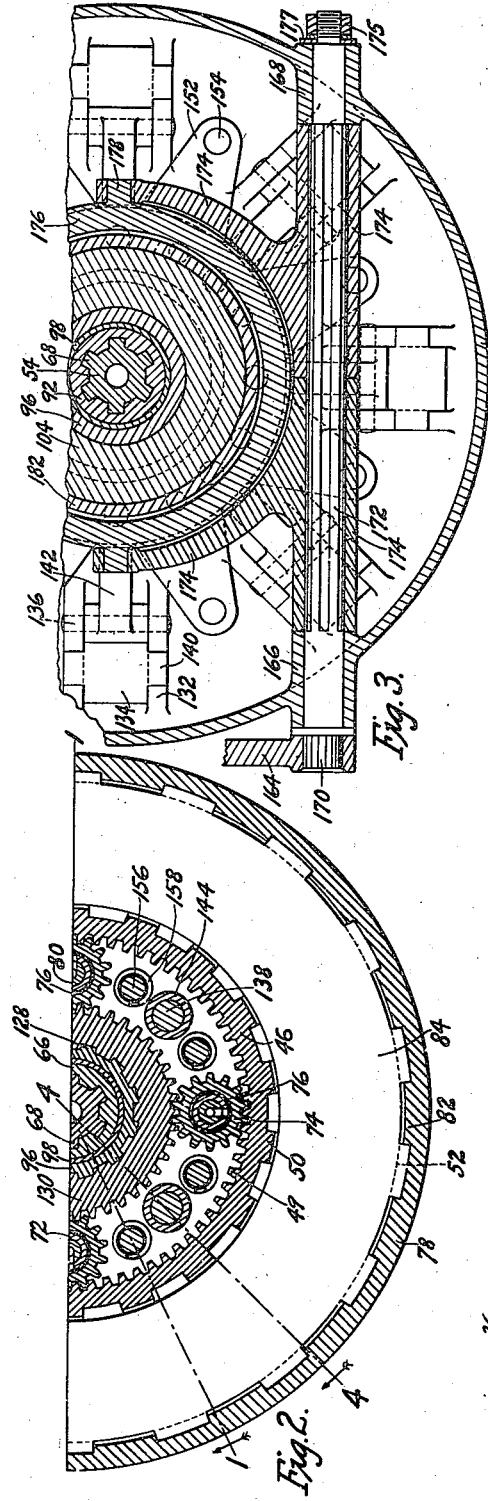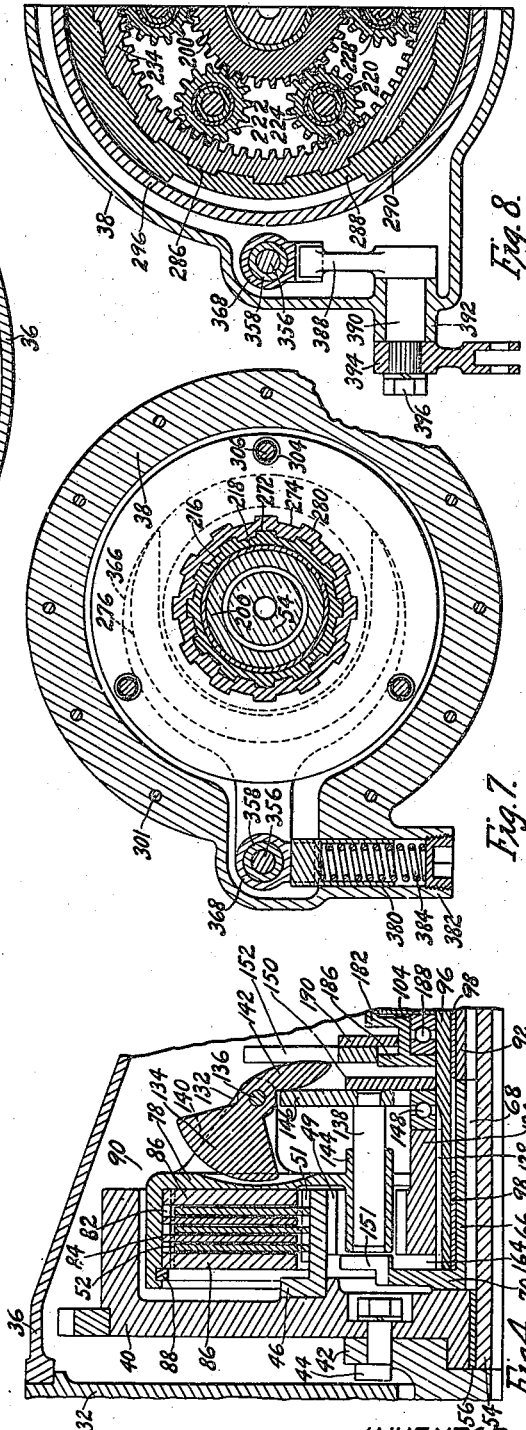

July 8, 1941.  F. W. COTTERMAN  2,248,492
VEHICLE TRANSMISSION GEARING
Original Filed Dec. 4, 1937  3 Sheets-Sheet 3
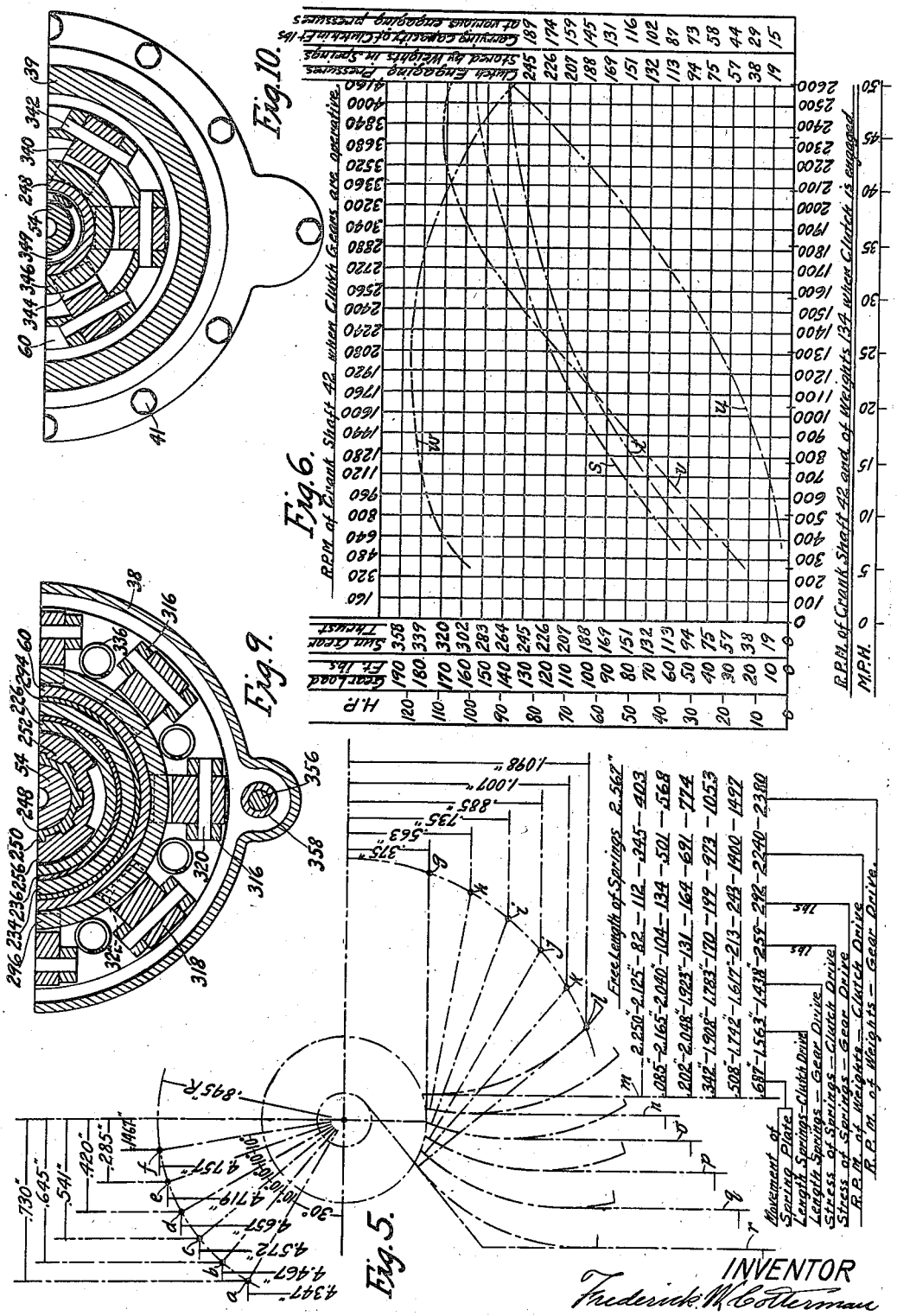
INVENTOR
Frederick W. Cotterman Patented July 8, 1941

2,248,492

UNITED STATES PATENT OFFICE 2,248,492

VEHICLE TRANSMISSION GEARING

Frederick W. Cotterman, Dayton, Ohio, assignor of one-half to Bessie D. Apple, Dayton, Ohio Original application December 4, 1937, Serial No. 178,191. Divided and this application June 8, 1938, Serial No. 213,417

16 Claims. (Cl. 74—260)

This invention is a division of my copending application Serial No. 178,191, filed Dec. 4, 1937, and relates to Vehicle transmission gearing, particularly of the automatic type.

An object of the invention is to provide, in a transmission mechanism, a low, a second, a high, an overdrive and a reverse ratio with minimum mechanism and in minimum space.

Another object is to provide in a transmission mechanism, a single planetary gear train comprising a ring gear, sun gear and planet pinions, with means to connect them variously with driving, driven and reaction members to provide second, high, overdrive and reverse ratios, and with one speed responsive mechanism to alter the connections necessary for a change from second ratio to high ratio and a second speed responsive mechanism to alter the connections necessary for a change from high ratio to overdrive ratio, and a manual means to selectively make one or another of two connections, one for all forward ratios and the other for the reverse ratio.

Another object is to provide a double ratio engine clutch mechanism especially adapted for use with the aforesaid transmission mechanism, said clutch mechanism comprising manually disengageable friction elements for disconnecting the engine from the transmission, but having also a planetary gear train similar to that in the transmission mechanism which automatically becomes connected in series with the transmission gears through torque responsive means when relatively heavy power requirements are encountered, the torque responsive means being such that the extent of the torque load which will connect the clutch gearing in series with the transmission gearing varies with the engine speed and therefore with the ability of the engine to meet the torque requirements, to the end that, upon the encounter of a relatively heavy load condition for the then existing speed of the engine, the second speed ratio of the transmission gear may become low gear by being put in series with the clutch gearing, the high speed ratio, if then in effect, may become second, and the overdrive, if then in effect, may become high, all momentarily until the load becomes lighter, or until the engine rises to a sufficiently higher speed to enable it to provide the needed torque, whereupon the clutch gear is automatically eliminated.

Another object is to provide, in the aforesaid transmission mechanism, positive jaw clutches for making the various connections for second, high, overdrive and reverse ratios, and wherein the automatic means for changing from second to high ratio and from high to overdrive ratio, is such, that one connection is always made before the other is completely unmade, entry of one set of jaws forcing the other set out, to the end that there is no point in the shift, from one ratio connection to the other, where there is no connection with either, whereby free-wheeling is prevented, before, after and during a shift in ratios.

Another object is to so arrange the aforesaid positive jaw clutches that only a single clutch need be disengaged and another engaged when either speed responsive mechanism operates to change a speed ratio.

Another object is to provide, in connection with the double ratio engine clutch mechanism, a friction brake as a reaction member for the gearing, while the lower or gear ratio is effective, while the friction clutch which disconnects the engine and transmission serves as a connecting means for the higher or clutch ratio, with means operative automatically by the clutch to completely release the brake an instant after the clutch engages, and operative automatically by the brake to completely release the clutch an instant after the brake engages, to the end that one of the two clutch ratios always becomes effective before the other lets go, whereby free-wheeling is prevented, before, after and during the change in ratios, and to the further end that the clutch and brake will not both remain connected for any extended time, whereby undue wear will not occur.

Other objects and meritorious features will become apparent as the invention is more fully described and reference is made to the drawings, wherein, Fig. 1 is an axial section through the complete transmission mechanism taken at 1—1 of Fig. 2.

Fig. 2 is a transverse section through the engine clutch and the clutch gearing taken at 2—2 of Fig. 1.

Fig. 3 is a transverse section through the manually operable means provided for disengaging the engine clutch, the section being taken on the line 3—3 of Fig. 1.

Fig. 4 is a partial section through the engine clutch and a part of its operating mechanism taken at 4—4 of Fig. 2.

Fig. 5 is a diagrammatic view of a part of the engine clutch operating mechanism.

Fig. 6 is a chart plotted from the diagram Fig. 5 showing the amount of torque load which may be transmitted through the engine clutch at various speeds without causing an automatic change in the clutch gearing to the lower ratio.

Fig. 7 is a transverse section, taken at 7—7 of Fig. 1, showing part of the mechanism for manually shifting from forward to reverse ratios.

Fig. 8 is a transverse section, taken at 8—8 of Fig. 1, through the transmission gearing, showing also a part of the forward and reverse shifting mechanism.

Fig. 9 is a transverse section, taken at 9—9 of Fig. 1, through the second-to-high speed responsive ratio changing mechanism.

Fig. 10 is a transverse section, taken at 10—10 of Fig. 1, through the high-to-overdrive speed responsive ratio changing mechanism.

Figs. 11 to 22 show schematically the jaws of the positive clutches and the extent and direction in which the side faces of the jaws are beveled in order that they may engage and disengage without clash and in order that one may remain partially engaged until full engagement of the other forces the first out of engagement.

Fig. 23 is a longitudinal section through the detent mechanism of the manually shiftable means for changing from forward to reverse ratios.

Fig. 24 is a transverse section taken at 24—24 of Fig. 1 through a part of the manually shiftable mechanism.

Fig. 25 is a fragmentary section through one of the centrifugal weights of the speed responsive high-to-overdrive shifting mechanism, showing its detent means.

Construction

A single housing 30 is provided for both the clutch and transmission. It is bolted to the engine 32 by bolts (not shown). A middle partition 34 divides the housing into a clutch housing 36 and a transmission housing 38. A rear bearing head 39 closes the rear end of the transmission housing and is secured to the housing by the screws 41.

In the clutch housing 36, a flywheel 40 is secured to the crank shaft 42 by the bolts 44. A ring gear 46 is secured to the flywheel by the screws 48. The ring gear 46 has helical gear teeth 49 on its interior surface and splines 50 on its exterior surface. Internally notched clutch discs 52 are slidable over the splines 50.

The drive shaft 54 at its front end is rotatable in bearing bushing 56 supported in the crank shaft 42. At the rear end it is rotatable in the bearing bushing 58 which is held in the driven member 60. Near its middle it is rotatable in the bearing bushing 62 carried in the middle partition 34.

The clutch planet pinion carrier comprises a long hub 66 secured to the drive shaft 54 by splines 68, and a flange 70 at the forward end.

Extending rearwardly from the flange 70 are four hollow studs 72 formed integral with the flange. Four planet pinions 74 having bearing bushings 76 are rotatable on the studs 72 and are thereby held in constant mesh with the internal teeth 49 of the ring gear 46.

A clutch drum 78 is secured to the ends of the hollow studs 72 by the bolts 80. The drum 78 has internal splines 82 to which the externally notched clutch discs 84 and the heavier outer discs 86 are slidably fitted. A spring ring 88 extends into a groove in the drum 78, to limit axial movement of the discs. The clutch may be broadly designated by the numeral 90.

A planet pinion carrier brake comprises a long hub 92, splinedly connected to the drive shaft by the splines 68, and a flange 94 in rubbing contact with the partition 34. The flange 94 retards rotation of the drive shaft 54 and consequently of the carrier flange 70 when there is any substantial axial pressure rearwardly on the carrier. The purpose of providing means for retarding rotation of the drive shaft and carrier, at times, will later appear.

Rotatably mounted on the hubs 66 and 92 is the sun gear brake operating member comprising a sleeve 96 having bearing bushings 98. A flange 100 at the rearward end of sleeve 96 has a coarse pitch screw 102 on its exterior. The inner ring 104 of the sun gear brake has coarse pitch internal threads fitted freely over the screw 102 and on its outer diameter has the splines 106 to which the internally notched brake discs 108 are slidably fitted.

The outer ring 110 of the sun gear brake is secured to the partition 34 by the screws 112. Ring 110 has internal splines 114 to which externally notched brake discs 116 are slidably fitted. A flange 118 extends inwardly from the outer ring 110 to limit axial movement of the brake discs. A flange 120 extends outwardly from the inner brake ring 104 for the purpose of compacting the discs. A thrust bearing 122 is interposed between the flange 100 and a plate 124 which abuts the face of the partition 34, leaving clearance for the flange 94.

The end thrust incident to the drawing up of the sun gear brake discs by the coarse pitch screw 102 is therefore transferred through the thrust bearing 122 to the housing and not put on the carrier brake flange 94 whereby the carrier is perfectly free to rotate when the sun gear brake is applied. The sun gear brake may be broadly designated by the numeral 126.

The outside of the sleeve 96 has splines 128, and upon these splines the internally splined sun gear 130 has limited axial movement. Since the coarse pitch screw 102 is left hand it is obvious that any torque load tending to rotate the sun gear backwardly will tend to draw up the sun gear brake, and that the degree to which the brake is applied will vary with the sun gear load. By backward rotation of the sun gear is meant rotation anticlockwise when viewed from the left of the drawings.

Extending from the rear face of the clutch drum 78 are pairs of hinge ears 132, between each pair of which a weight 134 is swingably supported by a hinge pin 136. Integral with each weight is a cam 142. Two lateral projections 140 extend from each weight 134 and rest upon the outer edges of the ears 132 and thereby limit inward swinging of the weight about its hinge pin.

A clutch-spring pressure plate 146 rests against the heels of the cams 142. The rear face of the clutch drum 78 near its inner diameter is provided with hubs 144 (see Fig. 4), into which guide pins 138 carried by the spring pressure plate 146 are slidably fitted, the function of the guide pins being to prevent any of the weights 134 acting ahead of another in their inward or outward swinging movement. Clearance cuts 151 are made in the carrier flange 70 to provide space into which the guide pins 138 may extend when they move forwardly.

A thrust bearing 148 is interposed between the rear face of the sun gear 130 and a sun gear reaction plate 150. A clutch engaging plate 152 carries a series of clutch engaging studs 154 and a second series of clutch spring studs 156, each having a clutch spring 158 surrounding it. A spacing collar 160 surrounds each stud 156 between the sun gear reaction plate 150 and the clutch engaging plate 152. The clutch spring studs 156 are slidable through the holes in the spring pressure plate 146, the springs 158 being held under initial stress between the plate 146 and the heads 159 of the spring studs 156. Clearance cuts 161 are provided in the flange 70 to permit the heads 159 to move forwardly when the clutch engages. The clutch engaging studs 154 have heads 162 which limit rearward movement of the plate 152 to the position shown in Fig. 1.

The helix angle of the teeth of sun gear 130 being right hand, it is obvious that as soon as engine power is applied to the ring gear 46 and vehicle resistance retards rotation of the carrier flange 70 the sun gear will attempt to revolve backwardly and will therefore simultaneously draw up the sun gear brake 126 and thrust the clutch engaging plate 152 rearwardly as far as the heads 162 of the studs 154 will permit. In this position the clutch is operating "in gear" as shown in Fig. 1.

Since the weights 134 are always rotatable in unison with the carrier flange 70 and drive shaft 54, the weights, through the cams 142, begin to urge engagement of the clutch 90 as soon as vehicle movement begins. The time at which clutch engagement will take place will of course depend on the degree of vehicle resistance as compared to the vehicle speed attainable against that resistance with the fuel being fed at the time.

The forward thrust of the weights 134 when opposed to the rearward thrust of the sun gear 130 tends to axially separate the spring pressure plate 146 from the reaction plate 150, but as long as the lesser of these two opposite thrusts does not exceed the initial tension of the springs 158 the two plates will remain together. There are speed and load conditions, however, wherein the reaction plate 150 will remain in the position shown, while the spring pressure plate 146 will move forwardly to such an extent that the springs 158 will be about one-third shorter than they are in the position shown.

As long as the rearward sun gear thrust exceeds the forward weight force, the clutch 90 will continue to operate "in gear," but when the weights exert sufficient forward force against the spring pressure plate 146 to act through the springs 158 and studs 156 on the clutch engaging plate 152, the sun gear will be pushed forwardly against its thrust until the clutch discs are brought together. As the clutch takes up the load the sun gear will be rotated forwardly by pressure against its right hand helical teeth which will move it axially forward into the space 164. Continued forward rotation of the sun gear completely releases the sun gear brake 126 by forward rotation of the left hand screw 102.

As the speed of the vehicle increases and decreases, the weights 134 move outwardly and inwardly thereby moving the spring pressure plate 146 forwardly and rearwardly, thus increasing and decreasing the stress of the springs 158. This changing in spring stress takes place with change in the rate of vehicle movement whether the clutch is operating "in gear" or "in direct." But anytime while it is "in gear," that the speed rises high enough to stress the springs an amount greater than the then existing load is thrusting the sun gear rearwardly, the clutch engaging plate 152 is drawn forward against the sun gear resistance and direct drive will be established.

In any speed torque controlled transmission, gear drive may be effective below certain speeds by applying engine power sufficient to slip the direct drive clutch.

Now inasmuch as the direct drive clutch is maintained in engagement by the force of centrifugal weights which increase their force as the square of the vehicle speed, it follows that where weights are kept small enough to permit gear drive to be brought back into play at speeds above say 30 M. P. H., by application of full engine power, then only one-fourth full engine power may be applied as 15 M. P. H., without slipping the clutch and effecting gear drive.

It is, however, more desirable to provide a mechanism wherein gear drive may be brought into play at 30 M. P. H., by application of full engine power, but wherein at least two-thirds full engine power may be applied at 15 M. P. H., without reverting to gear drive. This is desirable to permit lower speeds to be effected in direct drive without having the mechanism shift into gear drive when only a reasonable amount of power is being applied.

Conversely it is desirable when in gear drive and acceleration has proceeded until a speed of 10 to 15 M. P. H., has been attained, to have the mechanism to change to direct drive at that speed, if the operator, by applying only moderate power, indicates no desire for maximum acceleration. But, in conventional speed torque mechanisms, there is far too little weight force at these low speeds to cause a shift to direct drive and the mechanism remains in gear drive even though only moderate power is being applied and direct drive would be more desirable.

In the clutch mechanism herein shown the weights 134 are made large enough to provide the desired clutch engaging pressure when they are rotating at the lower speeds, then, in order to prevent these weights from applying too great a clutch engaging pressure at the higher speeds, the leverage through which the weights 134 act on the springs 158 is progressively decreased as the speed of rotation of the weights increase. This result is obtained by first positioning the weights 134 with their centers of gravity considerably farther from the transmission axis than their hinge pins 136 when the weights are clear in, and second, by constructing the work arm in the form of the cam 142, the heel of which rests against the spring pressure plate 146 when the weights are clear in, and the toe of which rests against the spring pressure plate when the weights are clear out.

Fig. 5 shows diagrammatically the movement of the center of gravity of a weight 134 and the corresponding movements of a cam 142. The point $a$ represents the center of gravity of a weight 134 when it is swung to the "in" position, the point $f$ represents the center of gravity when it is swung to the "out" position, and the points $b$, $c$, $d$ and $e$, represent intermediate positions. The points $g$, $h$, $i$, $j$ and $l$, represent the positions of the centers of the arcuate working face of the cam 142 corresponding to the several weight positions, that is, when the center of gravity of a weight is at $a$, the center of the arcuate face of the cam is at $g$; when the center of gravity of the weight is at $b$, the center of the arcuate face of the cam is at $h$, etc.

The lines $m$, $n$, $o$, $p$, $q$ and $r$ represent the position to which the spring pressure plate 146 has been moved when the center of the arcuate face of the cam has moved to positions g, h, i, j, k and l respectively.

From the diagram it will be seen that when the center of gravity of a weight is at a it is 4.347" from the transmission axis about which it rotates, and that it applies its centrifugal force to the spring pressure plate 146 through a lever, the power arm of which is .730" and the work arm of which is .375" while when the center of gravity of the weight is, for instance, in the position e, it is 4.719" from the transmission axis about which it rotates, and it applies its centrifugal force to the spring pressure plate 146 through a lever, the power arm of which is .285" and the work arm of which is 1.007". A given force applied by the weight of the spring pressure plate when the weight is clear out is only about 1/14 as effective as the same force would be if applied when the weight was clear in.

The columns of numerical values at the lower end of the diagram Fig. 5 give, from left to right, 1st, the movement of the spring compression plate caused by weight movement to b, c, d, e and f; 2nd, the length to which this movement compresses the springs if the mechanism is in direct drive; 3rd, the length to which the movement compresses the springs if the mechanism is in gear drive; 4th and 5th, the forces required to compress the springs to the lengths given in columns 2 and 3 respectively; and 6th and 7th, the R. P. M. which the weights must make about the transmission axis at their respective distances therefrom to create the required spring compressing forces through the leverage in effect at the respective positions.

Fig. 6 is a curve chart wherein the curve s is plotted from the numerical values in columns 5 and 7 in Fig. 5 and the curve t is plotted from the numerical values found in columns 4 and 6. The curve u is plotted to increase as the square of the R. P. M. and indicates the pounds force which centrifugal weights would apply to maintain clutch engagement if applied in the usual manner without changing the leverage through which the weights act. By curve s it may be found that when the clutch gearing is in gear drive and the vehicle speed is 10 M. P. H., the weights will be revolving 500 R. P. M. and will be stressing the springs with a force of about 130 pounds and that at this speed the engine must apply a force of as much as 68 out of a possible 186 foot pounds torque to the gears (see values at left of chart), in order to create a rearward sun gear thrust of 130 pounds and thereby maintain equilibrium.

It follows that if, at 10 M. P. H., in gear drive, slightly less than 68 foot pounds torque is applied to the gearing by the engine, a shift up to direct drive will take place. By the lower curve u it may be seen that the application of power to a conventional speed-torque mechanism would have to be reduced to something less than 6 foot pounds to compel the mechanism to remain in direct drive at 10 M. P. H. The result is that, with conventional speed-torque mechanisms, a shift up to the direct drive connection would not likely ever be had at 10 M. P. H., because of the great reduction in applied torque required to cause such a shift up. Such shift up might, however, be had at 10 M. P. H., with conventional mechanism when driving on a considerable down grade.

The same curve s shows that if, when in gear drive, the vehicle is moving 25 M. P. H., the weights will be revolving at 1310 R. P. M., and that the weights will have stressed the springs with a force of 223 pounds and that the engine must apply a torque of as much as 118 out of a possible 186 foot pounds to create a rearward sun gear thrust of 223 pounds to maintain equilibrium and thereby maintain direct drive. It follows that at 25 M. P. H., in gear drive, any reduction in applied torque to less than 118 foot pounds would bring the sun gear thrust to less than 223 pounds and permit the force of 223 pounds which was being applied to the springs by the weights to cause a shift up to direct drive.

Now the capacity of the underdrive clutch must be such that when it is engaged with a pressure of as much as 240 pounds (see values to right of chart) it will carry the maximum torque input for which the mechanism is designed, namely 185 foot pounds. By curve t it may be seen that if direct drive is in effect and the vehicle is moving 25 M. P. H., the weights will be revolving 1300 R. P. M. and stressing the springs with a force of 200 pounds and that in order to slip the clutch and bring in gear drive it will be necessary to apply about 154 foot pounds torque.

From the above it will be seen that, at a vehicle speed of 25 M. P. H., in gear drive, a reduction in torque application to less than 118 foot pounds is necessary to cause a shift up to direct drive, but if the vehicle maintains this speed of 25 M. P. H., after it has changed to direct drive there must be applied a torque of 154 foot pounds to restore gear drive.

This overlap is provided so that too slight changes in torque application will not continually shift from gear drive to direct drive and vice versa and thereby cause undue clutch wear.

The curve v is the maximum H. P. curve included to show that when, in accelerating the vehicle, the maximum torque, and consequently the maximum sun gear thrust, is maintained for all speeds as in curve w, the weight force shown in curve s will nevertheless rise and cross curve w at 2375 R. P. M. of the weights which occurs at 45 M. P. H., and that the engine will then be revolving 3800 R. P. M. at which its H. P. is at its maximum according to curve v.

Thus a shift up, out of the clutch gears will be enforced before the engine rotates so fast as to lose both in torque and horsepower. To maintain the clutch gears effective up to 45 M. P. H., it is therefore necessary to urge the engine to its maximum torque throughout the accelerating period. The proportion between the value of s and w for any speed indicates the percentage of maximum horsepower which must be maintained to prevent a shift up out of the clutch gearing at that speed.

Thus at 15 M. P. H., 790 R. P. M. of the weights, they urge discontinuance of gear drive and engagement of direct drive with a force of 165 pounds (see curve s). At this speed the sun gear thrust may, by application of maximum engine torque, be as much as 343 pounds (see curve w). It follows that, at 15 M. P. H., reducing the engine torque, by reducing the fuel, to 165/343 of maximum, that is, to 48% of maximum, will permit the weights to enforce a shift up out of the clutch gears.

After the clutch gears are eliminated by releasing the brake 126 and engaging the clutch 90, in order to shift back into gear drive, a torque application higher than the carrying capacity of the clutch for the then existing speed must be applied.

By curve t may be found the clutch engaging pressure at right of chart, for the weight speeds at bottom of sheet. This is the pressure exerted by the weights at a given speed to keep the clutch engaged once it is engaged.

Thus at 35 M. P. H., the weights revolve 1825 R. P. M. and compact the clutch discs with a force of 238 pounds at which speed the torque transmitting capacity of the clutch is 182 foot pounds. Now by consulting curve $w$ it will be found that at 1825 R. P. M., the possible engine torque is about 185 foot pounds. It follows that, if, at 35 M. P. H., with the clutch driving directly, an engine torque of 182 out of a possible 185 foot pounds is applied, the clutch will let go and gear drive will be restored. After 36 or 37 M. P. H., is exceeded, it is not possible, even by maximum engine torque application, to shift back into the clutch gears.

At 10 M. P. H., the weights revolve 525 R. P. M. and the curve $t$ shows they compact the clutch discs with a force of 108 pounds which enables it to carry 82 foot pounds. The possible engine torque at 525 R. P. M. (see curve $w$), is 164 foot pounds. It follows that, when the clutch is in direct drive and the vehicle is moving 10 M. P. H., it will require an application of $82/164$, or half the available engine torque to restore the drive through the clutch gears.

By curve $u$ it will appear that, at 10 M. P. H., only about 7 out of a possible 164 foot pounds engine torque could be applied to the clutch, without returning it to gear drive, if the weights were arranged in the conventional manner so as to apply their force to the clutch discs through an unvarying leverage.

The M. P. H., at the bottom of the chart Fig. 6 is that corresponding to the engine R. P. M. at the top of the chart when the clutch gears are operative and the transmission gears are connected for high gear, i. e., for one revolution of drive shaft 54 to one revolution of driven member 60. The M. P. H., is that which is had by using a 4 2/3 to 1 rear axle and 30" wheels.

Suitable modification must be made in the M. P. H., for other axles and other wheels. The M. P. H. scale will also be proportionately lower when it is connected for second gear and proportionately higher when it is connected for overdrive.

The shaft 54 hereinafter referred to as the drive shaft, is in fact the driven shaft of the clutch gearing and transmits the torque to the transmission gears in the rear compartment 38, and since the shaft must be selectively connected by jaw clutches in the rear compartment to the gearing for forward or rearward vehicle movement, it follows that the shaft must be provided with means to hold it non-rotative while the engine is running so that jaw clutch connection thereto may be made. This may preferably be accomplished by mounting a substantially conventional foot pedal in the usual place on the frame of the vehicle and so connecting it by a link to the upper end of the arm 164 (see Fig. 3) that the top of the lever will be pulled rearward when the clutch pedal is depressed.

In the walls of the clutch compartment 36 are two hubs 166 and 168. A clutch and brake operating shaft 170 has rotative bearing in these hubs. The middle portion of the shaft is externally splined at 172 and the internally splined clutch and brake operating fork 174 is fitted to the shaft. The arm 164 is rigidly secured to the outer end of the shaft 170 whereby operation of the arm operates the fork. A nut 175 and washer 177 holds the shaft in the housing.

A ring 176 has two laterally extending trunnions 178 which have bearing in the hubs 180 of the fork 174. The fork is made in halves to facilitate assembling the hubs 180 over the trunnions 178. Within the ring 176 is the clutch and brake operating collar 182. The inside diameter of the ring 176 should be considerably larger than the outside of the collar 182 to allow for the arcuate movement of the ring with respect to the shaft 170.

The collar 182 fits freely over the inner brake ring 104. A flange 184 is provided on the collar for the ring to engage. At the forward end another flange 186 engages the thrust bearing 188, the thrust bearing in turn engaging the inner brake ring.

Secured to the rear face of the clutch engaging plate 152 by the threaded studs 156 is a clutch releasing plate 190. This plate is made in halves to permit it to be assembled in the position shown.

It will be obvious that when the fork 174 is operated to press the ring 176 rearwardly, the ring will first move through about half its travel, then engage the flange 184 and, through the thrust bearing 188, push the inner brake ring 104 rearwardly to release the brake 126.

In the drawings, the clutch 90 is shown held released by the sun gear as it will always be during clutch gear operation, but if the clutch happens to be engaged when the fork 174 is operated the clutch will be disengaged by operation of the fork.

The reason for the clearance between the ring 176 and flange 184 which necessitates that the ring move through about half its travel before engaging the flange is, that when the brake plates 103 and 116 wear, this clearance will decrease. The clearance is made large enough that during the life of the vehicle the discs cannot possibly wear enough to take up all the clearance. In this way no adjusting means for the brake is needed.

Similarly the wear on the clutch discs 52 and 84 will be compensated for by increased expansion of the springs 158 whereby no clutch adjustment is required.

It will be seen that operation of the fork 174 holds both clutch and brake open. If either one is already open, then it need only open the other. When the fork is operated, the ring 176 is pressed against the flange 184, the flange 186 is pressed against the plate 190 which pulls the drum 78 and the carrier 70 rearward and holds the carrier brake flange 94 pressed against the partition 34. Thus complete depression of the clutch pedal will immediately bring the carrier 70 and consequently the shaft 54 to rest. When this occurs, the continued forward rotation of the ring gear 46 rotates the sun gear 130 backwardly through the planet pinions 74, which now rotate on their studs 72, but do not revolve about the shaft 54.

Resistance to backward rotation of the sun gear is now slight because the tangential load on the teeth is almost zero and the slight end thrust due to this tangential load is taken through the thrust bearing 148.

In a planetary gear train of the type herein employed, comprising three main elements, that is, the ring gear which may be referred to as R, the planet pinion carrier which may be referred to as C, and the sun gear which may be referred to as S, it will be found that:

1. If S is held against rotation, R is connected to the driving member and C is connected to the driven member, as is done in the clutch gearing hereinbefore described, a reduction in speed between the driving and driven members will result.

2. If S is still held against rotation and both the driving and driven members are connected to R while C remains unconnected, a direct drive between driving and driven members will be provided although the gearing will operate under no load.

3. If S is still held against rotation, C is connected to the driving member and R to the driven member, an overdrive between driving and driven members will result.

4. If S is connected to the driving member, R is connected to the driven member and C is held against rotation, the driven member will rotate backwardly with respect to the driving member.

The single set of planetary gearing contained in the compartment 38 is provided with means for making connections 1 to 4 thereby providing second gear, high gear, overdrive and reverse ratios.

It will be noticed that, in the above connections 1, 2 and 3, which provide second, high and overdrive, the sun gear remains connected at all times to the stationary member. Thus, in shifting from second to high, it is required only to disconnect the driven member from the carrier and connect it to the ring gear, and when changing from high to overdrive it is required only to disconnect the driving member from the ring gear and connect it to the carrier.

Inasmuch as a single change only in connections is required to effect a shift up in ratio, it simplifies the problem of making the changes automatically, one centrifugal device, operative above a predetermined speed, being provided to change the single connection which turns second into high, then while the change thus made remains effective, a second centrifugal device, operative at a higher speed changes the other simple connection required to provide overdrive.

Had the common practice been followed, i. e., the locking together of an entire planetary gear set to provide direct drive, no such simple changes in connections would produce the desired result, for, when the entire gear set is locked up for direct drive, no element may remain connected to the stationary member.

This would require that any automatic means which would change from second to high must, among other connections to be unmade and made, free the sun gear from the stationary member, while the change from high to overdrive must, among other connections, reconnect the sun gear to the stationary member.

Connection 4 is made manually and comprises disconnecting the sun gear from the stationary member and connecting it to the driving member, disconnecting the carrier from the driven member and connecting it to a stationary member, connecting the ring gear to the driven member, and freeing the driving member from the ring gear. The manual means for making these connections for reverse is operable to two working positions only, the one for reverse, the other, that shown in the drawings, being maintained during second, high and overdrive. The transmission gear mechanism will now be more fully described.

The drive shaft 54 has splines 192 to which the internally splined jaw clutch member 194 is closely fitted. The shape of a jaw 196 of the clutch member 194 is more clearly shown in Fig. 11, the jaws of the other clutches being shown in Figs. 12 to 22.

The thickness of the jaws and the amount of bevel on the side faces in Figs. 11 to 22 is drawn to the same scale as the other parts of the drawings, but the circumferential dimensions of the jaws are not to scale. All the clutches have three jaws and three spaces each having a circumferential dimension of one-sixth the circumference. This will make the jaws of the larger diametered clutches of greater circumferential dimension than those of smaller diameter and of course of greater circumferential dimension than that shown in the drawings.

Freely rotatable on the shaft 54 on bearing bushings 198 is the sun gear 200. At its forward end the sun gear hub has external splines 202 over which the internally splined jaw clutch member 204 is axially shiftable. The clutch member 204 is provided with a grooved collar 206 to facilitate shifting. One of its jaws 208 is shown in Fig. 12.

Surrounding and normally engaged with the clutch member 204 is the stationary clutch plate 210 secured by rivets 212 to the partition 34. One of the internal teeth 214 of plate 210 is shown in Fig. 13.

Clutch members 204 and 210 remain in engagement during second, high and overdrive ratios.

Freely rotatable on the sun gear hub is the planet pinion carrier 216, the long forwardly extending hub of which is provided with the bearing bushing 218. Six integral equally spaced hollow studs 220 extend rearwardly to rotatably support the planet pinions 222 in constant mesh with the sun gear 200. The pinions have bearing bushings 224.

The carrier clutch member 226 is held against the rear ends of the hollow studs 220 by the bolts 228. Clutch member 226 is provided with a bearing bushing 230, freely rotatable on shaft 54, and with internal jaws 232, one of which is shown in Fig. 20.

The ring gear 234, in constant mesh with the planet pinions 222, has a long rearwardly extending hub provided with a bearing bushing 236 freely rotatable on the member 226.

The long hub has internal splines 283 into which the externally splined clutch member 240 is axially slidable. The clutch member 240 has internal jaws 242, one of which is shown in Fig. 21, and a grooved collar 244 for shifting it axially.

Drive shaft 54 has splines 246. A long internally splined sleeve 248 has limited axial movement on the shaft splines. The sleeve 248 has external splines 250, and there are two internally splined clutch members 252 and 254 axially slidable on the sleeve. The clutch member 252 has external jaws 256, one of which is shown in Fig. 19. The clutch member 254 also has external jaws 258, one of which is shown in Fig. 22.

The internal jaws 242 and external jaws 258 are normally in mesh, thereby connecting the shaft 54 to the ring gear 234. A spring seat washer 260 is held positioned on the sleeve 248 by the spring ring 262 which springs into a groove in the sleeve. A second spring seat washer 264 is held by a shoulder on the sleeve. A spring 266 is held under substantial initial stress between the washer 260 and the jaws 256. A second spring 268 is similarly held between the jaws 258 and the washer 264. The spring 268 urges the clutch member 254 forwardly, but it can move it forwardly no farther than the position shown, in which its jaws 258 are fully meshed with the external jaws 242 for the reason that the end of the spring 268 is restrained from further expansion by contact with the jaws 242.

Similarly when, in making overdrive connection, the external jaws 256 are being pressed by the spring 266 into mesh with the internal jaws 232, the spring may be expanded only until the jaws 256 are fully meshed with the jaws 232, whereupon the end of the spring will come in contact with the face of the jaws 232 and further movement of the clutch member 252 is prevented.

Midway of the length of the sleeve 248 it is grooved externally for the spring ring 270. The internal splines of the clutch members 252 and 254 do not extend the full length of the body of the members, in each case the splines being shorter than the body an amount which is slightly more than the thickness of the clutch jaws 254 and 258 (see Fig. 1). The shortened internal splines allow a certain amount of axial movement of the clutch members 252 and 256, the movement being limited by contact of the ends of the splines with the spring ring 270.

When the mechanism is as shown in Fig. 1, the engaged member 254 could be moved forwardly, without having the ends of its splines encounter the spring ring 270, a distance slightly more than the thickness of the jaws, and the disengaged member 252 could be moved rearwardly, without having the ends of its splines encounter the spring ring 270, a distance slightly more than half the thickness of the jaws. The purpose of thus limiting the axial movement of the clutch members on the sleeve will later appear.

The hub of the planet pinion carrier 216 has external splines 272 over which the internal splines of a sleeve 274 are axially slidable.

A grooved collar 276 is held on the forward end of the sleeve by the spring ring 278 for shifting the sleeve axially. The sleeve 274 has external splines 280 over which the internally splined clutch member 282 is axially slidable. The clutch member 282 has external jaws 284, one of which is shown in Fig. 15.

The outside of the ring gear 234 has splines 286 and the internally splined clutch member 288 is axially slidable thereon. The clutch member 288 has external jaws 290, one of which is shown in Fig. 18.

The driven member 60 at its rear end is rotatable in the ball bearing 292, held to the driven member 60 by the screw 291 through intermediate parts 293, 295 and 297, and supported exteriorly in the bearing head 39, the front end being provided with a bearing bushing 294 which is freely rotatable on the hub of the ring gear 234. A large cup shaped member 296 has a rearwardly extending hub fitting slidably over driven member 60. The means which allows axial movement of the member 296 on the driven member 60 but compels rotation therewith will be later described.

The member 296 has a set of internal clutch jaws 298, one of which is shown in Fig. 16, and another set of internal clutch jaws 300, one of which is shown in Fig. 17. A spring ring 302 is inserted between the jaws 298 and 300 as a stop to limit entrance of internal jaws 284 to full depth. A ring 299 held by rivets 301 has internal clutch jaws 303 which are identical in size with jaws 298 and 300 but have the side faces beveled differently. One jaw 303 is shown in Fig. 14. The ring 299 is partly cut away at 305 to allow the shifter fork mechanism to be assembled more readily.

The internal jaws 298 and external jaws 284 are normally in mesh, thereby connecting the driven member 60 to the carrier 216. Springs 304 on studs 306 urge the clutch member 282 to full depth engagement. Springs 308 on studs 310 hold the clutch member 288 against the clutch member 282.

The internal splines of the clutch member 288 are not nearly so long as the clutch member itself. A saucer shaped stop member 312 is held against the front face of the ring gear 234 to engage the forward ends of the internal splines and limit forward movement of the clutch member.

A stop shoulder 314 on the rear end of the sleeve 274 limits rearward movement of the clutch member 282. It will be noticed that the stop shoulder 314 limits movement of the engaged clutch member 282 to slightly more than the thickness of the jaws while the stop 312 limits movement of the disengaged clutch member 288 to slightly more than half of the thickness of the jaws. The purpose of thus limiting the axial movement of the clutch members will later appear.

Near the forward end, the driven member 60 has ears 316 between which the second-to-high centrifugal weights 318 are hinged by the pins 320. Each weight has a work arm 322 extending into an opening 324 in the hub of the clutch member 296, whereby outward swinging movement of the body of the weight will draw the member 296 rearwardly until the rear end of the hub encounters the front edges of the ears. The arms 322, by extending into the openings 324 serve as a driving means between the driven member 60 and the clutch member 296.

A detent is provided by placing two balls 326 with a spring 328 between them in a tranverse hole in the weight, then providing shallow depressions 330 in the inside faces of the ears into which the balls may rest.

Between pairs of ears 316 are webs 332 carrying studs 334 supporting springs 336. The springs 336 always urge the clutch member 296 forwardly while any centrifugal force in the weights tend to draw the member 296 rearwardly. The detents tend to hold the weights to their "in" position when they are in, and to the "out" position when they are out, thereby insuring that when the weights start from one position to the other, they must inevitably go all the way.

Near the rear end, the driven member 60 is provided with slots 338 in which the high-to-overdrive centrifugal weights 340 are hinged to the pins 342. Each weight has a work arm 344 extending into a notch in the forward face of a collar 346. The collar 346 bears against a flange 348 extending outwardly from the sleeve 248 whereby outward swinging of the weights 340 draws the sleeve rearwardly against the stressed spring 349. A washer 351 arranged to rotate with shaft 54 receives the reaction of the spring. At its outer diameter, the collar 346 extends over and slightly beyond the rear face of the flange 348 so as to provide a stop for outward movement of the weights. The overhanging rear edge of the collar will encounter the face of the driven member 60 without binding the flange 348 to retard its free rotation with respect to the collar. Exactly the same detent mechanism is employed for the weights 340 as was explained relative to the weights 318.

Forward of the weights 340 in the same slots 338 are plates 350 which extend through the slots and into the groove of the collar 244. At their outer ends the plates are secured to a grooved collar 352 by screws 354. The collar 352 has radial grooves fitting the plates snugly whereby the plates are more adequately held to their position by the screws. Shifting the collar 352 forwardly will carry with it the collar 244 although the two collars may be rotating at different speeds.

The manual forward-to-rearward shifting mechanism is supported on a rod 356 riveted in the partition 34 and supported at the rear end in the bearing head 39. A tube 358 is axially slidable on the rod. Near the rear end of the tube a stamped shifting fork 360 is held against a shoulder on the tube by the nut 362. Near the forward end of the tube two shifting forks 364 and 366 and a detent block 368 are all held against a shoulder on the tube by the nut 370. The two forks 364 and 366 are held spaced apart by the collar 372.

The fork 360 extends into a groove in collar 352 while the forks 364 and 366 extend respectively into the grooves of collars 206 and 276 whereby forward or rearward shifting of the tube 358 moves the three collars simultaneously.

The detent block 368 is provided in its underside, with three notches (see Fig. 23), a deep notch 374 for its "forward" position, another deep notch 376 for the "rearward" position and a third shallower notch 378 for "neutral." The detent 380, vertically slidable in a hub 382 by the spring 384, is shown in the notch 374 whereby the mechanism is set for forward running.

An operating notch 386, also in the underside of the block 368, receives the upper end of an arm 388. The arm 388 is rotatable with a short shaft 390 extending through the hub 392. A second arm 394, held to the outer end of the shaft 390 by the nut 396, is provided. The lower end of arm 394 may be connected by a suitable rod to any desired shifting means preferably a hand lever fulcrumed on the wall which separates the engine and passenger compartment.

Lubrication of the entire mechanism is provided by extending a hole 398, which comes through the crank shaft 42, through the entire length of the drive shaft 54 and providing a plurality of transverse oil holes extending from the hole 398 to the parts requiring lubrication.

Since the clutch and transmission gearing have relatively small teeth and a large number of driving surfaces in action, the relatively light oil used for engine lubrication will be satisfactory for the clutch and transmission mechanism whereby the same oil reservoir and pump ordinarily provided for engine lubrication may be used for the mechanism herein shown.

Proportion

While the mechanism shown may be proportioned for use with any horse powered engine and vehicle weight within reason, some suggestion as to proportion for a given vehicle may preferably be given.

If the largest dimension of the clutch housing 36 is taken as 15", and other parts made to the same scale, the mechanism will be suitable for an engine of around 120 H. P. in a vehicle of approximately 4000 lb. weight.

The clutch planetary gearing is 14 pitch, 20 degree pressure angle, 23 degree helix angle. The ring gear has 70 teeth on a pitch diameter of 5.432"; the sun gear 42 teeth on a pitch diameter of 3.259"; the planet pinions 14 teeth on a pitch diameter of 1.086". The sun gear helix angle is right hand.

Arranged as shown the ratio of the clutch gearing is $$\frac{R+S}{R} = \frac{70+42}{70} = 1.6 \text{ revolutions}$$

of the engine to one of the drive shaft 54.

The transmission gearing is 14 pitch, 20 degree pressure angle, 14 degree helix angle. The ring gear has 63 teeth on a pitch diameter of 4.638"; the sun gear 33 teeth on a pitch diameter of 2.429"; the planet pinions 15 teeth on a pitch diameter of 1.104". The sun gear helix angle is right hand.

Connected as shown in the drawings for second gear, the transmission gearing will have a ratio of $$\frac{R+S}{R} = \frac{63+33}{63} = 1.524 \text{ revolutions}$$

of the drive shaft 54 to one revolution of the driven member 60.

Connected for high gear ratio as hereinbefore explained, the ratio is of course one drive shaft revolution to one driven member revolution.

Connected for overdrive ratio as hereinbefore explained the ratio will be $$\frac{R}{R+S} = \frac{63}{63+33} = .656 \text{ revolution}$$

of drive shaft 54 to one revolution of the driven member 60.

Connected for reverse gear ratio as hereinbefore explained the ratio will be $$\frac{R}{S} = \frac{63}{33} = 1.909 \text{ revolutions}$$

of the drive shaft 54 to one revolution of the driven member 60.

When the clutch gearing is operative at the same time that second gear connection is made in the transmission, low gear is effective, the ratio for low gear being $1.6 \times 1.524 = 2.44$ engine revolutions to one revolution of the driven member 60.

Similarly when the clutch gearing is operative at the same time that the reverse gear connection is made in the transmission, the ratio will be $1.6 \times 1.909 = 3.054$ to 1.

By using a 4⅔ to 1 rear axle, the overall ratio would be,

| | | |
|---|---|---|
| Low gear | 4⅔ × 2.44 equals | 11.4 to 1 |
| Second gear | 4⅔ × 1.524 equals | 7.12 to 1 |
| High gear | 4⅔ × 1. equals | 4.66 to 1 |
| Overdrive | 4⅔ × .656 equals | 3.06 to 1 |
| Reverse | 4⅔ × 3.054 equals | 14.23 to 1 |

The foregoing ratios are substantially those used in standard practice in automotive gear shift mechanisms.

The helix angle of the coarse pitch screw 102 which operates the sun gear brake 126 has a left hand helix angle which is at 30 degrees with the axis of the shaft 54. The proportion of the springs 158 was hereinbefore given. Other dimensions of the engine clutch parts may be determined by scaling the drawings.

The main springs 336 which resist outward movement of the second-to-high centrifugal weights 318 are 8 in number and so proportioned that they together provide a stress of 123 pounds when the weights are "in" and 143 pounds when the weights are "out." By making the springs of .054" round wire coiled $\tfrac{7}{16}$" pitch diameter, 14 coils per spring and a free length of 4.227", the above stated stresses will be had.

The spring 349 which resists outward movement of the high-to-overdrive centrifugal weights 340 is so proportioned that it provides a stress of 122 pounds when the weights are "in" and 150 pounds when the weights are "out." By making the springs of .148" round wire coiled 1⅛" pitch diameter, 7 coils, and a free length of 3.366", the desired stresses will be had.

The second-to-high jaw clutch engaging springs 304 and 308 are exactly alike and are numbered differently only to facilitate description. There are three springs 304 and three springs 308. They should be made of .041" round wire, coiled ⅜" pitch diameter, 10½ coils, and a free length of 1.281".

The high-to-overdrive jaw clutch engaging springs 266 and 268 are exactly alike and numbered differently to facilitate description. They should be made of $\tfrac{5}{32}$" round wire, coiled 2⅛" pitch diameter, 4 coils, and a free length of 1.281".

The detent springs 328 should be made of .035" round wire, coiled ¼" pitch diameter, 6 coils, and a free length of .708".

With the springs proportioned as above indicated the shift from second-to-high ratio will occur when the accelerator is released at any speed above 20 M. P. H., while the shift from high to overdrive will occur when the accelerator is released at any speed over 40 M. P. H. The shift down from overdrive-to-high will occur at or below 32 M. P. H., while the shift down from high-to-second will occur at or below 16 M. P. H.

*Operation*

The operation of the mechanism is as follows:

To start the engine, the manually shiftable tube 358 is first moved thru the hand controlled lever 394, Fig. 8, until the detent 380 drops into the shallow neutral notch 378. This movement places the sun gear clutch jaws 208 midway between the stationary jaws 214 and the drive shaft jaws 196. It also releases the ring gear jaws 242 from the drive shaft jaws 258. In this position, neither the sun gear 200, nor the ring gear 234 are connected to the drive shaft and the drive shaft may therefore rotate without driving any of the transmission gears.

As soon as the engine revolves the clutch ring gear 46, the tendency will be to drag the planet pinions after it. There being no load on the gearing the carrier 70 and weights 134 will pick up speed. This will operate the clutch 90 into engagement because there is not now any load to apply the sun gear brake 126. The drive shaft 54 will now rotate at engine speed but having no connection with the transmission gearing it rotates idly.

After the engine is started and sufficiently limbered up, the foot pedal (not shown) is depressed to draw the top of the clutch operating arm 164 rearwardly, which causes the ring 176 to engage the flange 184 and pull the flange 186 against the clutch releasing plate 190.

The clutch 90 is shown held disengaged by load on the sun gear 130, but since it engages during engine warming, the depression of the clutch pedal draws it to the disengaged position shown, by reason of the flange 186 acting against the plate 190.

Now the same depression of the clutch pedal which draws the clutch to disengaged position also pushes the brake to released position by acting through the thrust bearing 188 on the inner brake ring 104. The same depression of the clutch pedal creates friction between the ring 176 and flange 184, and between the flange 186 and the clutch releasing plate 190, the pressure between the flange 186 and plate 190 being transferred through the heads 162 of the clutch engaging studs, through the carrier to the carrier brake flange 94 which thereby frictionally engages the partition 34.

The operation of the clutch pedal therefore almost instantly disengages the clutch, releases the brake and brings the drive shaft to a stop. Continued forward rotation of the ring gear 46 by the engine will then rotate the sun gear 130 rearwardly through the planet pinions, but inasmuch as the sun gear is under no load it is not difficult to hold the sun gear brake 126 released since it is urged into engagement only in proportion to the load on the sun gear.

With the drive shaft non-rotative, a connection to the transmission gearing, either for forward or reverse, is selected and readily made. If the driver desires to reverse the vehicle, he now moves the hand controlled lever 394 to shift the tube 358 until the detent 380 drops into the notch 376. This movement engages the sun gear clutch jaws 208 with the drive shaft jaws 196, engages the carrier jaws 284 with the stationary jaws 303, allows the springs 308 to engage the ring gear jaws 290 with the driven member jaws 300, and releases the ring gear jaws 242 from the drive shaft jaws 258.

It will be noticed that the above jaws which are to engage each other are well beveled on their side faces in such a manner that the directions of rotation which the above connections produce will cause the one set of jaws to slide down the inclined faces of the jaws which they engage into mesh.

With the above connection made, i. e., with S the driver, R the driven and C held non-rotative, the vehicle is in reverse. If the operator now desires to cause forward movement of the vehicle he first depresses the clutch pedal to release the clutch and brake and bring the drive shaft to a stop, then shifts the hand control to bring the detent 380 into the notch 374, which is the notch shown in the drawings, and which setting makes R the driver, C the driven and S the non-rotative member, then he releases the clutch pedal.

The clutch engaging weights are not rotating when the clutch pedal is first released, therefore there is as yet no tendency to engage the clutch. The sun gear is, however, rotating backwards driving the brake discs 108 through the coarse pitch screw 102.

As soon, therefore, as the clutch pedal is released the brake 126 will engage, and the clutch gearing will operate with R the driver, C the driven, and S the non-rotative member. Since the transmission gearing now has the connections made for second gear, having the same elements connected as the clutch gearing, the ratio between the engine and the driven member 60 will be clutch $$\frac{R+S}{R} \times \text{transmission } \frac{R+S}{R}$$

Substituting the numbers of teeth for the several gears the ratio will be $$\frac{70+42}{70} \times \frac{63+33}{63} = 2.44$$

engine turns to one driven member turn.

When the transmission is thus connected for second gear, and the clutch gear operates in series with it, the low gear ratio will be in effect. As soon now as the carrier 70 picks up speed, the weights 134 will begin to change the degree of stress in the springs 158. Assume then that the engine has brought the speed of the weights 134 up to 774 R. P. M. (see right hand column Fig. 5). At this speed the springs are being stressed to 164 pounds. (Follow 774 R. P. M. at bottom of chart Fig. 6 to curve s then right to 164). If the engine power represented by curve w is now allowed to drop to as little as 88 out of a possible 182 foot pounds, the curve w will cross the curve s and the clutch 90 will engage.

Referring to the M. P. H., figures at the bottom of the chart Fig. 6, the value 15 M. P. H., is below 774 R. P. M. of the weights. The M. P. H., given in the chart, as before stated is that which would result with the transmission gearing in high. The above shift out of low into second would therefore occur at $$\frac{63}{63+33} \times 15 = 9.8 \text{ M. P. H.}$$

under the circumstances indicated.

If the engine torque had been kept at maximum value as shown in curve w, the curve w would not have crossed the curve s to cause a shift up until 2380 R. P. M. of the weights, which is 45 M. P. H., on the chart Fig. 10, but which would be $$\frac{63}{63+33} \times 45 = 29.5 \text{ M. P. H.}$$

The maximum speed at which low gear may be maintained is therefore 29½ M. P. H., and this only by rotating the engine 3800 R. P. M., which rotates the weights 134 at 2380 through the clutch gears.

Assuming the operator did shift from low to second gear at 9.8 M. P. H., as above indicated, he may now continue on in second gear as long as he does not apply torque in excess of the curve t for the then existing speed of the weights shown at bottom of chart Fig. 6.

After he exceeds 20 M. P. H., in second gear, the second-to-high centrifugal weights 318 will be generating enough force to overcome the main springs 336 plus the detent springs 328. If the accelerator is released after 20 M. P. H., the weights will move to the "out" position, drawing the clutch member 296 rearwardly. This movement must ultimately disengage the jaws 298 from the jaws 284 and engage the jaws 300 with the jaws 290.

Such a connection will provide a direct drive between the drive shaft 54 and the driven member 60 for the reason that the ring gear is normally connected to the drive shaft through the jaws 242 and 258 and if the ring gear now also becomes connected to the driven member 60 through the jaws 290 and 300, then both driving and driven members will be connected to the same ring gear. Since the sun gear 200 continues connected to the stationary member through the jaws 208 and 214, the planet pinion carrier 216 will revolve forwardly without load at $$\frac{63}{63+33}$$

or ²¹⁄₃₂ engine speed. When the weights 318 move out and start making the shift from second to high, the jaws 290 are rotating $$\frac{63+33}{63}$$

times as fast as the jaws 300 and although the jaws 300 are drawn by the weights 318 to their ultimate rearward position, the jaws 290 are pushed away by the jaws 300 against the resilient resistance of the springs 308 and, due to the proper beveling of the side faces of the jaws, the jaws 290 temperarily ratchet over the jaws 300 as long as their speed is different.

When movement rearwardly by the clutch member 296 attempts to draw the jaws 298 out of engagement with the jaws 284, the jaws 284 are caused by the springs 304 to follow after. But the jaws 284 cannot follow all the way because of the shoulder 314. The shoulder arrests rearward movement of the jaws 284 and the jaws 298 continue rearward until the jaws 284 remain meshed with the jaws 298 slightly less than half depth.

Due to the degree of side beveling of the jaws, the jaws 284 will now lose rotative speed with respect to the jaws 298 by ratcheting over them as the engine speed is let down until the drop in carrier speed brings the ring gear into synchronism with the clutch member 296 whereupon the jaws 290, which up to this time have been ratcheting over the jaws 300, are driven by the springs 308 into full depth mesh with the jaws 300 against the stop ring 302.

As the jaws 290 are entering the jaws 300, and when at half way mesh, the forward end of the clutch member 288 strikes the carrier clutch member 282 whose jaws 284 are still half meshed with the jaws 298. Therefore before the jaws 290 may enter the jaws 300 more than halfway mesh they must push the jaws 284 to less than half meshed with the jaws 298.

The foregoing arrangement prevents freewheeling, i. e., during the engine let down, while the half meshed jaws are ratcheting, there is no position in the change over where the operator could not depress the accelerator and ratchet the sun gear ahead of the clutch member 296, until the drop in engine speed was back up where it started, whereupon the still half meshed jaws 284 would positively drive the jaws 298 forwardly in second gear.

Likewise during the engine let down or ratcheting period the vehicle may never overrun the engine for the reason that when the engine let down brings the half meshed jaws 284 to $$\frac{63}{63+33}$$

or ²¹⁄₃₂ of the speed of the jaws 298, the jaws 290 and 300 will be synchronized, and if further engine let down and consequent further reduction in speed of the jaws 290 is attempted, the jaws 290 will be driven positively by the jaws 300 even though but slightly meshed, whereby the engine may be driven forward by the vehicle through the gearing at any time during the change over.

Due to the fact that the detent springs 328 assist the springs 336 in holding the weights 318 to the "in" position and oppose the springs 336 in their effort to return the weights, the speed in higher gear must be dropped to 16 M. P. H., or less, before the weights will change the connections from high back to second. The process will be readily understood from the drawings where the stop member 312 is used instead of the stop shoulder 314. This engages the ends of the internal splines of the clutch member 288 to drag the jaws 290 half out of mesh with the jaws 300 when the clutch member 296 moves back to the position shown in the drawings. The jaws 284 then ratchet over the ends of the jaws 298 until the engine speed is brought up to $$\frac{62+33}{63}$$

times the speed that it was rotating when the shift down was begun, whereupon synchronism will be reached between jaws 284 and 298 and they will drop into full mesh, thereby pushing the still half meshed jaws 290 and 300 all the way out. This reestablishes second gear connection.

At any speed over 40 M. P. H., in high gear, the weights 340 will be exerting sufficient centrifugal force to draw the clutch member 248 rearwardly, against the resistance of the main spring 349 and the holding force of the detent springs 328, provided the accelerator is released.

When the weights are moving out and drawing the member 248 to its rearward position, the spring ring 270 encounters the forward ends of the internal splines of the member 254 at such position in advance of the end of the travel of member 248 that the jaws 258 are drawn slightly more than half out of mesh with the jaws 242 when the member 248 reaches its extreme rearward position.

When the clutch member 254 has thus moved rearward the spring 266 presses the beveled faces of the jaws 256 against the beveled faces of the jaws 232, and since, at the time of shift, the jaws 256 are rotating faster than the jaws 232 there will be ratcheting between them.

By reason of the fact that jaws 258 are now only half meshed with the jaws 242, the engine speed may be let down by ratcheting the jaws 258 over 242 until the engine speed has been reduced to $$\frac{63}{63+33}$$

or $^{21}\!/_{32}$ of its former value, at which time the jaws 256 and 232 synchronize and are therefore pushed by the spring 266 to full mesh or two way driving relation, which of course pushes the half meshed jaws 258 and 242 all the way out of mesh.

Just as described relative to the second-to-high shifting mechanism, there is, in the high-to-overdrive shifting mechanism, no position in the shift where sudden acceleration of the engine will not drive the vehicle or where the vehicle may move forward without rotating the engine.

When the vehicle speed is reduced below 32 M. P. H., the weights 340 will move in, provided the accelerator is released. The connections shown in the drawings between jaws 258 and 242 will be reestablished by ratcheting over and by one set pushing the half meshed other set out of mesh in the same way as described relative to the shift up.

While in the foregoing there is described the manner in which the clutch gearing is connected in series with the transmission gearing to provide an overall low gear ratio, it will be understood that no matter in which ratio the transmission gears are connected, any sudden need of more power may be had by bringing the clutch gearing into series with the transmission gearing whether the transmission gearing is connected for second, for high, or for overdrive.

Assume them, that the operator is driving with the clutch 90 engaged, and the transmission gearing connected for high gear, i. e., with the weights 318 "out" and the weights 340 "in." If he is moving 30 M. P. H., the engine would be revolving 1570 R. P. M. and the clutch 90 will be held engaged with a force of 222 pounds (see curve $t$ Fig. 6) and the power transmitting capacity of the clutch is 170 foot pounds. The maximum engine torque which may be created at 1570 engine R. P. M. is 184 foot pounds (see curve $w$ Fig. 6).

If then, under these circumstances, the need for maximum acceleration arises, the operator may, by creating as much as 171 out of a possible 184 foot pounds engine torque, slip the clutch 90 and engage the brake 126. When this occurs, at 30 M. P. H., as stated, the engine will rise to a speed of 2515 R. P. M. (see top of Fig. 6), giving an increase in horse power corresponding to the difference on the horse power curve $v$ between the numerals 1570 and 2515 at top of Fig. 6, i. e., an increase from a possible 56 to a possible 88 H. P.

Similarly, when the transmission gearing is connected for overdrive and the speed is anything less than 56 M. P. H., the clutch gearing may be brought in by the application of the full power of the engine.

When the clutch gearing is brought in with overdrive connection in the transmission, the resultant overall ratio is substantially that which is had with the transmission in high and without the clutch gearing. Similarly when the clutch gearing is brought in with high gear connection in the transmission, the resultant overall ratio is substantially that which is had with the transmission in second gear and without the clutch gearing. Cutting in of the clutch gearing is at anytime equivalent to reducing the overall ratio by one speed.

The general scheme of providing a centrifugal weight such as 134 with a cam, such as 142, to produce a convex centrifugal force curve such as curve $s$ or $t$ Fig. 6, instead of a concave curve such as curve $u$ Fig. 6, whereby the clutch engaging force of the weights is more in proportion to the engine torque curve $w$ Fig. 6, than in structures of common practice, was first suggested in my copending application Serial No. 40,946 (Patent No. 2,120,831, filed September 17, 1935.

The combination of such weights with a friction clutch was first proposed in my copending application Serial No. 59,879, filed January 20, 1936.

The general scheme of providing jaw clutches whereby a member may be disconnected from a second and connected to a third and wherein there is no position in the transition period where the engine will not drive the vehicle, or where the vehicle momentum will not drive the engine, was first proposed in my copending application Serial No. 40,946, filed Sept. 17, 1935, and above mentioned. (Now Patent No. 2,120,831.)

The general scheme of making a single set of planetary gears comprising a ring gear, a sun gear, and planet pinions, provide a second gear ratio, a high gear ratio, an overdrive ratio, and a reverse ratio was first proposed in my copending application Serial No. 142,464, filed May 13, 1937. This scheme has been amplified in my copending application Serial No. 148,751, filed June 17, 1937, the amplication consisting in new and different mechanism for making the various connections which provide the different ratios.

In my copending application Serial No. 178,191, filed December 4, 1937, of which this application is a division, the claims are directed to the torque responsive double ratio clutch mechanism, while in the present application they are directed to the speed responsive second, high, overdrive and reverse gear set.

I claim:

1. In an automotive transmission gear mechanism, a sun gear, a gear coaxial therewith, a planet pinion in mesh with both said gears, a planet pinion carrier, an input member, an output member, a non-rotatable member, connecting mechanisms for a second gear ratio comprising means connecting the sun gear to the non-rotatable member, means connecting the coaxial gear to the input member, and means connecting the carrier to the output member, means for changing to a high gear ratio comprising means for disconnecting the output member from the carrier and connecting it to the coaxial gear while the sun gear remains connected to the non-rotatable member, means for changing to an overdrive ratio comprising means for disconnecting the input member from the coaxial gear and connecting it to the carrier while the sun gear still remains connected to the non-rotatable member and the coaxial gear remains connected to the output member, and means for changing from the second gear ratio to a reverse ratio comprising means for disconnecting the sun gear from the non-rotatable member and connecting it to the input member, means for disconnecting the carrier from the output member and connecting it to a non-rotatable member, means for connecting the concentric gear to the output member, and means for disconnecting the concentric gear from the input member.

2. The structure defined in claim 1 wherein the means for changing to a high gear ratio and the means for changing to an overdrive ratio is speed controlled while the means for changing to a reverse ratio is manually controlled.

3. An automatic transmission gear comprising, a sun gear, a gear coaxial therewith, a planet pinion in mesh with both gears, a planet pinion carrier, an input member, an output member, a non-rotatable member, and normally operative underdrive ratio connecting means whereby the input member is connected to the coaxial gear, the output member to said carrier and the sun gear to the non-rotatable member, in combination with means to change to a direct drive ratio comprising means for disconnecting the output member from the carrier and connecting it to the coaxial gear, means to change from the direct to an overdrive ratio comprising means for disconnecting the input member from the coaxial gear and connecting it to the carrier, and means to change from the underdrive to a reversing ratio comprising mechanism for disconnecting the sun gear from the non-rotatable member and connecting it to the input member, for disconnecting the carrier from the output member and connecting it to the non-rotatable member, and for disconnecting the concentric gear from the input member and connecting it to the output member.

4. The structure of claim 3 with a speed responsive device for effecting the change from underdrive to direct drive, a second speed responsive device for effecting the change from direct drive to overdrive, and a manually operable device for changing from underdrive to reverse.

5. Transmission mechanism comprising, a sun gear, a planet pinion in mesh with said sun gear, a second gear in mesh with said pinion, a planet pinion carrier, an input member, an output member, a non-rotatable member, means whereby the sun gear may be connected to either the input member or the non-rotatable member, means whereby the planet pinion carrier may be connected to either the output member, the input member, or the non-rotatable member, means whereby the second gear may be connected to either the input member or the output member, and a speed responsive device for connecting the output member to the second gear when the input member is already connected thereto.

6. The structure of claim 5 with a second speed responsive device for freeing the input member from the second gear and connecting it to the carrier while the output member remains connected to said second gear.

7. The structure of claim 5 with a manual means for freeing the sun gear from the non-rotatable member and connecting it to the input member, freeing the carrier from the output member and connecting it to the non-rotatable member, and freeing the second gear from the input member and connecting it to the output member.

8. Transmission mechanism comprising, a sun gear, a planet pinion in mesh with said sun gear, a second gear in mesh with said planet pinion, a planet pinion carrier, an input member, an output member, a non-rotatable member, means whereby the sun gear may be connected to either the input member or the non-rotatable member, means whereby the planet pinion carrier may be connected to either the output member, the input member, or the non-rotatable member, means whereby said second gear may be connected to either the input member or the output member, and a speed responsive device operative at a predetermined speed to connect the output member to the part to which the input member is already connected, whereby the input and output members have unitary rotation.

9. The structure of claim 8 with a second speed responsive means operative at a higher speed to disconnect the input member from the part to which it was first connected and connect it to the part to which the output member was first connected.

10. The structure of claim 8 with a manually shiftable means to free the sun gear from the non-rotatable member and connect it to the input member, to free the carrier from the output member and connect it to the rotatable member, and to free the second gear from the input member and connect it to the output member.

11. Transmission mechanism comprising a first gear, a second gear, a planet pinion in mesh with both gears, a planet pinion carrier, an input member, an output member, a non-rotatable member, a speed controlled mechanism whereby the output member may be joined to the carrier or the second gear, a second speed controlled mechanism whereby the input member may be joined to the second gear or the carrier, and a manually controlled mechanism whereby the first gear may be joined to the stationary member or the input member, the carrier may be joined to the output member or the stationary member, and the second gear may be joined to the input or the output member.

12. The structure of claim 11 wherein the first speed controlled means, when below a certain speed, holds the output member joined to the carrier, and above the certain speed holds the output member joined to the second gear.

13. The structure of claim 11 wherein the first speed controlled means, when below a certain speed, holds the output member joined to the carrier, and above the certain speed holds the output member joined to the second gear, and wherein the second speed controlled means, when below a predetermined speed, holds the input member joined to the second gear, and above the predetermined speed holds the input member joined to the carrier.

14. In an automotive transmission mechanism, a sun gear, a gear coaxial therewith, a planet pinion in mesh with both said gears, a planet pinion carrier, an input member, an output member, a non-rotatable member, connecting mechanism for a second gear ratio comprising means connecting the sun gear to the non-rotatable member, means connecting the coaxial gear to the input member, and means connecting the carrier to the output member, means for changing to a high gear ratio comprising means for disconnecting the output member from the carrier and connecting it to the coaxial gear while the sun gear remains connected to the non-rotatable member, and means for changing to an overdrive ratio comprising means for disconnecting the input member from the coaxial gear and connecting it to the carrier while the sun gear still remains connected to the non-rotatable member, and the coaxial gear remains connected to the output member, said means for changing to a high gear ratio including a speed responsive device operable above a predetermined speed to effect said changes, and the means for changing to an overdrive ratio includes a second speed responsive device operable above a higher speed to effect said changes and said connecting and disconnecting means comprises jaw clutches with means associated with said clutches whereby the disengaging jaw clutch remains half way meshed until the engaging jaw clutch is meshed more than half way, thereby pushing the disengaging jaw clutch entirely out of mesh, whereby free wheeling is prevented.

15. In an automotive transmission gear mechanism, a sun gear, a gear coaxial therewith, a planet pinion in mesh with both said gears, a planet pinion carrier, an input member, an output member, a non-rotatable member, connecting mechanism for a high gear ratio comprising means connecting the sun gear to the non-rotatable member, and means connecting the coaxial gear to both the input and output members, and means for changing to an overdrive ratio comprising means for disconnecting the input member from the coaxial gear and connecting it to the carrier while the sun gear remains connected to the non-rotatable member and the coaxial gear remains connected to the output member, said means for changing to an overdrive ratio including a speed responsive device and said disconnecting and connecting means comprising jaw clutches with means associated with said clutches whereby the disengaging jaw clutch remains half way meshed until the engaging jaw clutch is meshed more than half way, thereby pushing the disengaging jaw clutch entirely out of mesh, whereby free wheeling is prevented.

16. In an automotive transmission gear mechanism, a sun gear, a gear coaxial therewith, a planet pinion in mesh with said sun gear and coaxial gear, a planet pinion carrier, an input member, an output member, a non-rotatable member, connecting mechanism for a second gear ratio comprising means connecting the sun gear to the non-rotatable member, means connecting the coaxial gear to the input member, and means connecting the carrier to the output member, and means for changing to a high gear ratio comprising means for disconnecting the output member from the carrier and connecting it to the coaxial gear while the sun gear remains connected to the non-rotatable member, said means for changing to a high gear ratio including a speed responsive device and said disconnecting and connecting means comprising jaw clutches with means on said clutches whereby the disengaging jaw clutch remains half way meshed until the engaging jaw clutch is meshed more than half way, thereby pushing the disengaging jaw clutch entirely out of mesh, whereby free wheeling is prevented.

FREDERICK W. COTTERMAN.